March 7, 1972   R. N. FOSTER   3,647,657
PROCESS FOR PRODUCING PROPYLENE
Filed Aug. 19, 1970   3 Sheets-Sheet 2

United States Patent Office 3,647,657
Patented Mar. 7, 1972

3,647,657
PROCESS FOR PRODUCING PROPYLENE
Richard N. Foster, 182 Beacon St., Boston, Mass. 02172
Filed Aug. 19, 1970, Ser. No. 65,214
Int. Cl. C07b *29/06;* C07c *5/18*
U.S. Cl. 204—168                                7 Claims

ABSTRACT OF THE DISCLOSURE

In a process for producing propylene by dehydrogenation of propane wherein propane is introduced into a reactor having walls defining a chamber, a reaction zone within said chamber, an inlet to admit the propane to the chamber, an outlet to discharge propylene and hydrogen from the chamber, a structure of electrically nonconductive material supported in said reaction zone, said structure having channels for the passage of propane, hydrogen, and propylene, and a plurality of electrically conductive, catalytically active particles separately supported on said structure, said particles being electrically insulated one from another and having surface portions exposed to direct contact with said propane in said channels, wherein the propane is heated to a temperature in the range 400° F. to 1200° F., and wherein the propane is then brought into contact with the surface portions of the particles to catalyze the dehydrogenation of the propane to form propylene, and wherein the propylene is then withdrawn from the reactor, an improvement comprising applying, while said propane is in contact with said surface portions, an electric potential, difference between electrodes spaced apart one from another and opposed across said reaction zone, thereby causing said propane to react more rapidly to form propylene.

BACKGROUND OF THE INVENTION

This invention relates to producing propylene from propane. It is well known that propylene can be produced by passing propane at a temperature of about 1000° F. over a heterogeneous catalyst such as chromia. In this process a portion of the propane passing over the catalyst undergoes a reaction in which it yields propylene and hydrogen. Any technique which increases the portion of propane undergoing the reaction reduces the size of the equipment required for a given production and thereby tends to reduce the production cost.

SUMMARY OF THE INVENTION

A primary object of this invention is to enhance the yield of propylene in a process producing propylene by the heterogeneously catalyzed dehydrogenization of propane. Another object is to produce propylene at low cost.

The invention features in a process for producing propylene by dehydrogenation of propane wherein propane is introduced into a reactor having walls defining a chamber, a reaction zone within said chamber, an inlet to admit the propane to the chamber, an outlet to discharge propylene and hydrogen from the chamber, a structure of electrically nonconductive material supported in said reaction zone, said structure having channels for the passage of propane, hydrogen, and propylene, and a plurality of electrically conductive, catalytically active particles separately supported on said structure, said particles being electrically insulated one from another and having surface portions exposed to direct contact with said propane in said channels, wherein the propane is heated to a temperature in the range of 400° F. to 1200° F., and wherein the propane is then brought into contact with the surface portions of the particles to catalyze the dehydrogenation of the propane to form propylene, and wherein the propylene is then withdrawn from the reactor, an improvement comprising applying, while said propane is in contact with said surface portions, an electric potential difference between electrodes spaced apart one from another and opposed across said reaction zone, thereby causing said propane to react more rapidly to form propylene. A preferred embodiment features use of chromia catalyst, and applies an electric field maintained below the level producing ionization and periodically reversed at a rate between 0.5 kHz. and 3.0 kHz.

Other objects, features, and advantages will appear from the following description of a preferred embodiment of the invention, taken together with the attached drawing thereof.

DESCRIPTION OF PREFERRED EMBODIMENT

Figure 1:
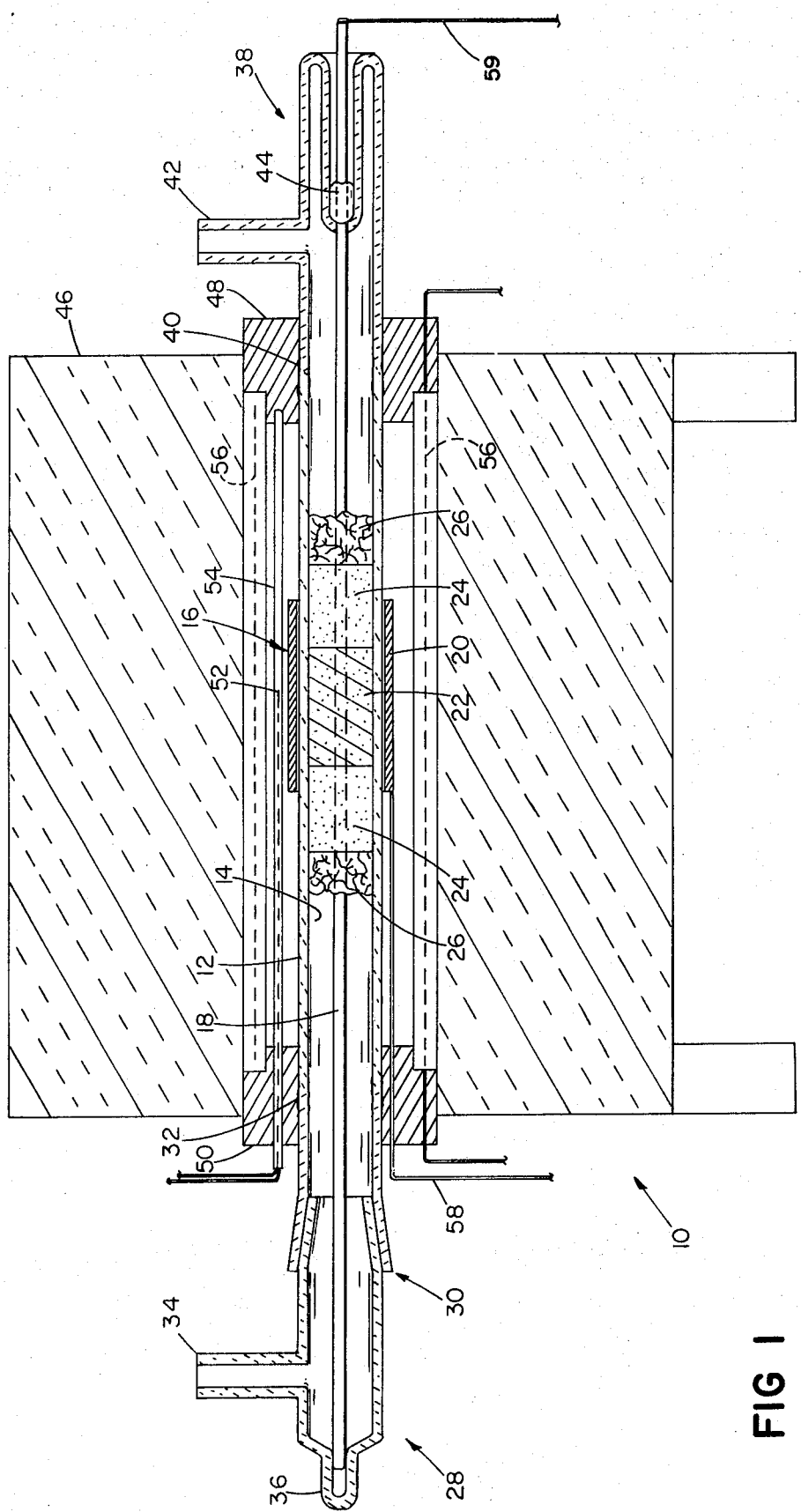
FIG. 1 is a longitudinal cross-section of a prototype reactor useful for the practice of the inventin.

Shown particularly in FIG. 1 is a prototype reactor 10 having tubular shaped wall 12 made of quartz 1 mm. thick enclosing a chamber 14. Reaction zone 16 is situated within chamber 14 at a position approximately midway between the ends of chamber 14. A first electrode 18 made of 316 stainless steel and having a rod-like form 1/16 inch diameter is supported along the axis of chamber 14. A second electrode 20 in the form of a cylindrical sleeve (outside diameter ½ inch, wall thickness 1/16 inch) is situated around chamber wall 12 outside of reaction zone 16. A catalyst support bed 22 consisting of packed grains of porous alumina (to be described in greater detail hereinafter) is supported within chamber 14 and between electrode 18 and electrode 20. A filler 24 of glass sand is packed on either side against, and holds in place, the catalyst support bed 22. Pyrex wool backing 26 is stuffed into chamber 14 at either end of the reaction zone and holds glass sand 24 in place.

Pyrex glass inlet section 28, having a ground glass joint 30 to facilitate assembly, is attached to reactor wall 12 through graded glass seal 32. Inlet section 28 has a port 34 for admittance of reactants and support tip 36 slideably supporting an end of electrode 18. Pyrex glass outlet section 38 is attached to reactor wall 12 through graded seal 40. Outlet section 38 has an outlet port 42 and supports electrode 18 rigidly in Kovar seal 44. Cylindrical asbestos insulating wall 46 (inner diameter approximately 1″, wall thickness 2″) is supported coaxially around reactor wall 12 by asbestos insulator plugs 48 and 50. Thermocouple 52 is inserted in quartz thermowell 54 which passes through and is supported by asbestos plugs 48, 50. Heater element 56 is supported within insulating wall 46. Outer electrode lead 58 passes through insulator plug 50 and makes electrical contact with outer electrode 20. Inner electrode lead 59 is attached to and makes electrical contact with the end of inner electrode 18.

Figure 2C:
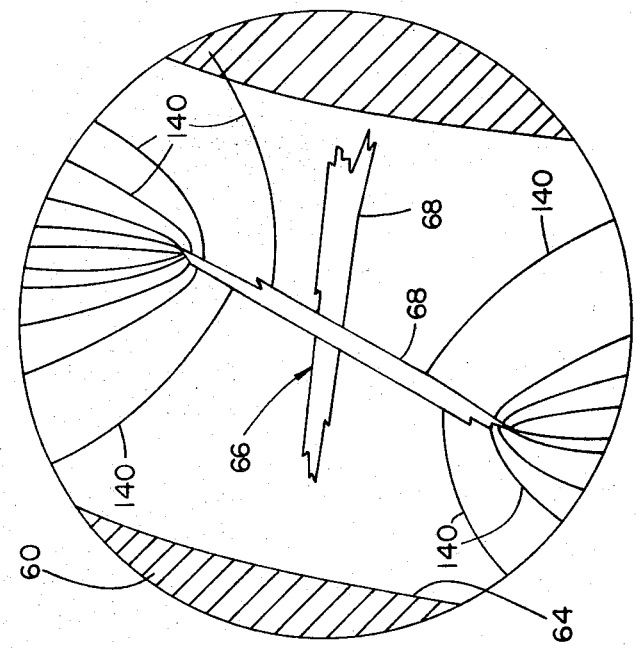
FIG. 2*c* is a still further enlarged cut away view showing a portion of the structure shown in FIG. 2*b*.
Figure 2B:
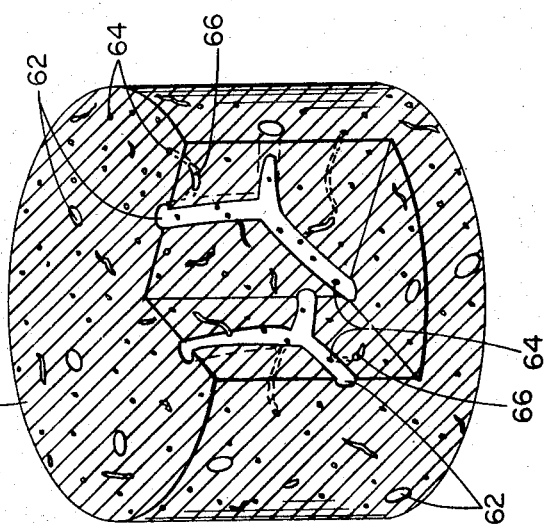
FIG. 2*b* is a view cut away and further enlarged of a portion of a grain from the support bed shown in FIG. 2*a*.
Figure 2A:
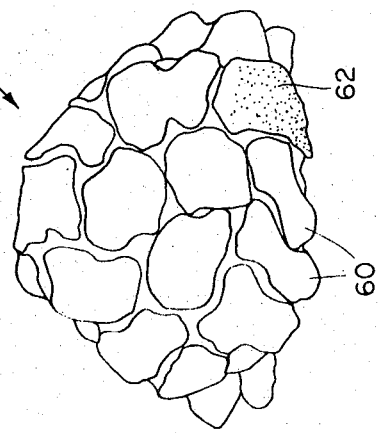
FIG. 2*a* is an enlarged view of a portion of the support bed in the reaction zone of the reactor shown in FIG. 1.

Referring now particularly to FIGS. 2a, 2b, and 2c, catalyst support 22 is a packed bed of irregularly shaped grains (approximately 0.1 mm. across) of alumina, the grains being made by crushing catalyst pellets manufactured under the trade name "Harshaw CR–1404–P." Each grain 60 has a spongy, porous structure and is penetrated by a number of interconnecting channels 62. Branching out from channels 62 are a large number of smaller channels 64 which penetrate into the substance of grain 60. On the interior surface of channels 64 there are affixed to the surface of the alumina structure electrically conductive (the term taken in a sense including both metals and semi-conductors) catalyst particles 66 consisting of clustered chromia needles 68 having sharp points (typically with radius of curvature less than 10 A.). The chromia particles are individually supported on the surface of the channels separate one from another and so do not make electrical contact with each other. Channels 62 are typically 10,000 A. or greater in diameter, small channels 64 are typically 5000 A. or less in diameter, and chromia cluster particles are typically 100 A.–2000 A. across. The catalyst support 22 typically has a surface area of 1 m.$^2$/g. to 700 m.$^2$/g. with up to 20% of its surface covered by chromia.

Figure 3:
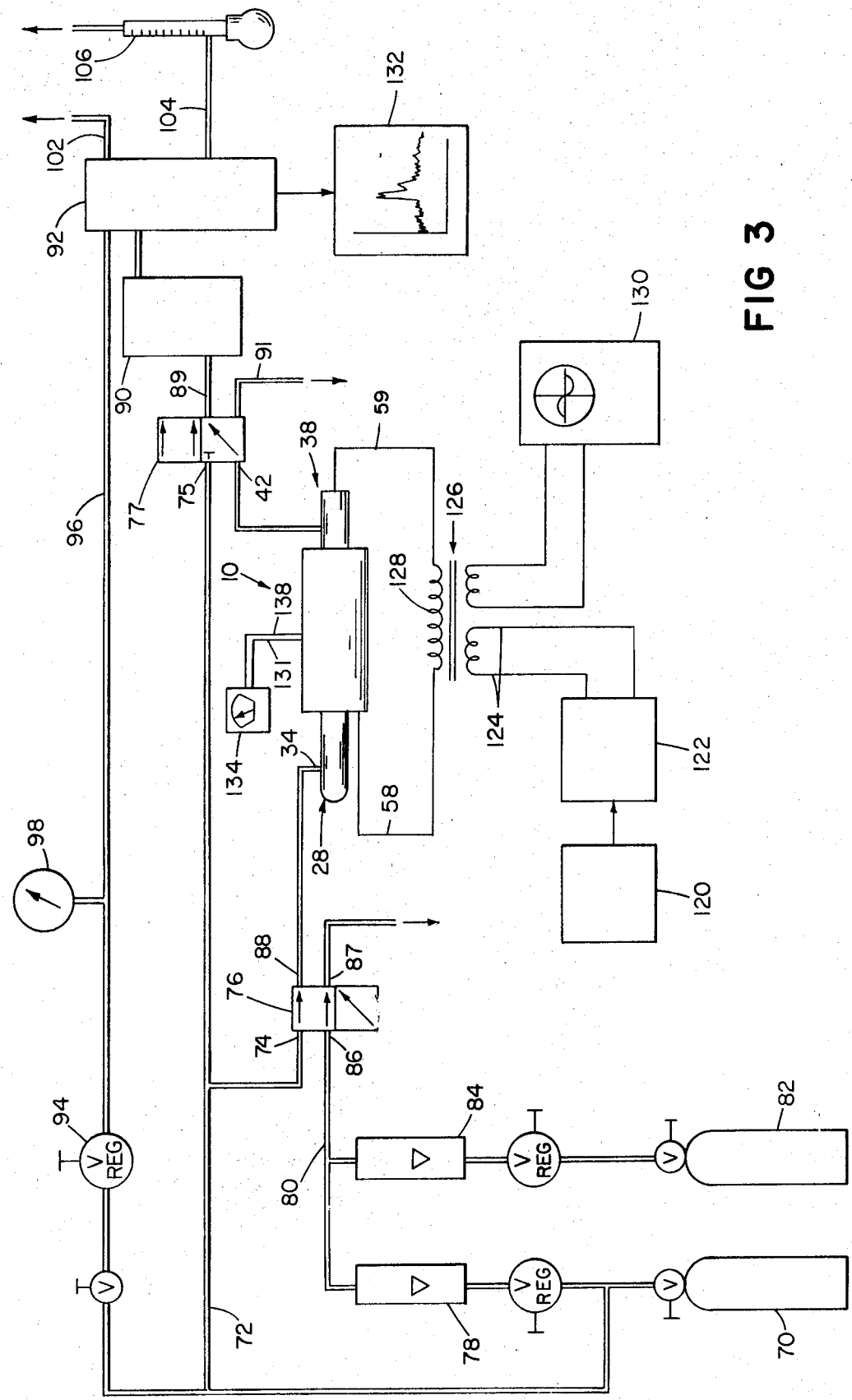
FIG. 3 is a schematic flow diagram for making propylene by dehydrogenation of propane according to the invention.

Referring now especially to FIG. 3 showing a flow diagram for making propylene according to the invention, helium from tank 70 is piped through conduit 72 to inlet ports 74 and 75 of sampling valves 76 and 77 respectively and also piped through rotameter 78 to mixing conduit 80. Propane tank 82 is piped through rotameter 84 to mixing conduit 80. Conduit 80 is piped to a second inlet port 86 of sampling valve 76. Sampling valve 76 has a dump vent 87 and an outflow conduit 88 piped to inlet port 34 of reactor 10. Outlet port 42 of reactor 10 is piped to an inlet of sampling valve 77. Conduit 89 leads from sampling valve 77 to chromatographic separation column 90, and conduit 91 from sampling valve 77 provides an outlet from the system. The outlet from chromatographic column 90 is piped to thermal conductivity cell 92. Helium from tank 70 is also piped to cell 92 through pressure regulator 94 and conduit 96. Pressure gage 98 is connected to conduit 96. Cell 92 has a dump vent 102 and an outlet port 104 piped to soap film meter 106. Signal generator 120 is connected to the input of amplifier 122. The output of amplifier 122 is connected through leads 124 to the input of transformer 126. The secondary winding 128 of transformer 126 is connected through lead 58 to the outer electrode and through lead 60 to the inner electrode of reactor 10. An output from transformer 126 is also connected to oscilloscope 130. Recorder 132 is connected to the output of thermal conductivity cell 92. Variac 134 is connected through leads 131 and 138 to the reactor heater element 56.

Prior to operation, the catalyst bed is prepared by raising the temperature of the reactor to 1250° F. as monitored by thermocouple 52 and introducing air into the reaction chamber for 4 hours followed by hydrogen for 4 hours, then air for 4 hours, and finally hydrogen for 4 hours. After the bed is thus prepared, care is exercised to avoid exposing the bed to an oxidizing atmosphere.

The system may be operated in a pulsed production mode with continuous production monitoring or a continuous production made with intermittent product monitoring. The pulsed production mode is primarily used for testing the system operation, whereas the continuous operation mode is suitable for production runs.

In pulsed mode operation, sample valve 76 is supplied with two different gas streams. The first of these, entering through inlet 74, is pure helium supplied from tank 70 through conduit 72. The second inlet 86 is supplied from mixing conduit 80 with a mixture of propane and helium in a define mixture ratio which can be ascertained from the readings of rotometer 78 through which the helium flows and rotometer 84 through which the propane flows. In its quiescent condition, sampling valve 76 vents the propane-helium mixture through vent 87 and passes the pure helium through conduit 88 to inlet port 34 of reactor 10. The reactor is thus supplied with a pure helium stream which flows through the channels of the catalyst bed without change and then passes out of the reactor through port 42. From port 42 the stream passes through valve 77, which in the pulsed mode of operation connects port 42 to conduit 89, as shown in FIG. 3, through column 90, through soap film meter 106, and is discharged. With the pure helium flowing steadily, the temperature of the reactor is raised to the operating temperature by making appropriate adjustments of variac 134 supplying power to the reactor heater element 56. The electrical enhancement apparatus is energized, so that oscillator 120 supplies a voltage oscillating at a predetermined frequency to amplifier 122, which drives transformer 124. An oscillating voltage is consequently applied between electrodes 18 and 20 by winding 128 through leads 58 and 59. The voltage difference applied to the electrodes 18 and 20 produces an electric field extending from one electrode to the other through reaction zone 16 of the reactor. The field inductively polarizes each particle of chromia, redistributing the electric charge over the surface of each particle and producing especially high fields in the vicinity of the sharp points of the chromia needles. The approximate shape of the field is indicated in FIG. 2c by the field lines 140. The polarity of the induced surface charge and the direction of the field reverse periodically in response to the periodically reversing voltage difference applied to the electrodes. Sampling valve 76 is next actuated by manual operation, whereupon it admits a definite quantity (a typical quantity in the apparatus shown in FIG. 1 being 4 cc.) of the propane-helium mixture into conduit 88 while shutting off the stream of pure helium. A definite and known quantity of propane-helium mixture is thus introduced into the reactor. The increment of propane-helium mixture flows from inlet port 34 into chamber 14 where it is heated to reaction temperature (typically between 1000° F.–1100° F.) and then flows through the channels 62 and 64 in the alumina support bed in the reaction zone where it is exposed to contact with the chromia particles there supported and periodically polarized by the electric field. Some of the propane, under the catalytic effect of the chromia and the eelctric field undergoes a reaction forming propylene and hydrogen and other products in side reactions. The reaction products then pass on through the channels in the alumina bed to the outlet section 38 and thence out of reactor through outlet port 42. From port 42 the reaction products flow through valve 77 and conduit 89 to chromatographic column 90 and thermal conductivity cell 92 where they are analyzed, and then through soap film meter 106 and are discharged from the system.

The operation of the system in the continuous mode is essentially the same except that sampling valve 76 after being actuated to admit propane-helium mixture to conduit 88 continues indefinitely to pass the mixture into conduit 88 and thence to the reactor, while sampling valve 77 is normally set to discharged product through conduit 91 and only intermittently diverts the product stream to conduit 89 for measurement.

Typical values of parameters of the particular reactor shown in FIG. 1 and process are as follows:

Gas pressure: 25 p.s.i.a.
Mixed gas ratio: Propane/helium=1/3
Flow through reactor: 160 cc. (STP) per min.
Bed surface area: 70 m.$^2$/g.
Fraction of surface in $Cr_2O_3$: 20%

Typical production results using the described equipment and process are shown in Tables 1 and 2. Runs in which no electric field was present are included for comparison.

TABLE 1.—RESULTS OF CONTINUOUS MODE OPERATIONS

| Run No. | Temp., °F. | Volts | Freq., Hz. | Conversion, percent | $C_3H_6$ | $C_2H_6$ | $C_2H_4$ | $CH_4$ | Note) |
|---|---|---|---|---|---|---|---|---|---|
| 1 | 72 | | | *0 | *0 | *0 | *0 | *0 | (1) |
| 2 | 72 | 360 | 1,500 | 0.3 | 0.1 | *0 | 0.2 | *0 | (1) |
| 3 | 72 | 1,200 | 1,500 | 4.0 | 2.4 | 0.5 | 0.4 | 0.7 | (1) |
| 4 | 1,025 | 0 | | 10.7 | 6.2 | 0.6 | 0.4 | 1.9 | (1) |
| 5 | 1,025 | 560 | 1,500 | 48.5 | 11.7 | 4.4 | 14.6 | 17.8 | (1) |
| 6 | 1,025 | 6,600 | 1,500 | 10.2 | 3.1 | 0.5 | 4.1 | 1.8 | (2) |
| 7 | 1,025 | 0 | | 1.2 | 0.7 | *0 | 0.3 | 0.2 | (3) |
| 8 | 1,025 | 1,800 | 1,500 | 1.0 | 0.7 | *0 | 0.2 | 0.1 | (3s |

¹ Chromia catalyst on alumina support.
² No catalyst or support.
³ Alumina support but no catalyst.
*Less than 0.002%.

TABLE 2.—RESULTS OF PULSE MODE OPERATION

| Run number | Temperature, °F. | Volts | Frequency Hz. | Conversion, percent | Notes |
|---|---|---|---|---|---|
| 9 | 1,050 | 0 | | 0.8 | (1) |
| 10 | 1,050 | 2,580 | 1,500 | 5.1 | (1) |
| 11 | 1,100 | 0 | | 1.4 | (1) |
| 12 | 1,100 | 2,580 | 1,500 | 7.8 | (1) |
| 13 | 1,100 | 1,700 | 500 | 1.2 | (1) |
| 14 | 1,100 | 1,700 | 1,000 | 1.5 | (1) |
| 15 | 1,100 | 1,700 | 1,500 | 1.9 | (1) |
| 16 | 1,100 | 1,700 | 2,000 | 2.1 | (1) |
| 17 | 1,100 | 1,700 | 2,500 | 2.8 | (1) |
| 18 | 1,100 | 1,700 | 4,000 | 2.7 | (1) |

¹ Chromia catalyst on alumina support.

The enhanced conversion of propane as a result of the joint action of the catalyst particles and the electric field can be readily seen from the data of the tables, notably in comparing runs 4, 5, and 8. In run 8, where a voltage was applied but no catalyst particles were present, the conversion was 1.0%; in run 4 where catalyst particles were present but no voltage was applied, the conversion was 10.7%; in run 5 with both catalyst and applied voltage, the conversion rose to 48.5%. The effect of the joint action of the catalyst and electric field in changing the product mix is also evident from the data on continuous operation. The data on the pulsed operation indicates that the conversion is improved by increasing the applied voltage up to 2580 volts and by increasing the frequency up to 2500 Hz.

What is claimed is:

1. In a process for producing propylene by dehydrogenation of propane wherein propane is introduced into a reactor having walls defining a chamber, a reaction zone within said chamber, an inlet to admit the propane to the chamber, an outlet to discharge propylene and hydrogen from the chamber, a structure of electrically nonconductive material supported in said reaction zone, said structure having channels for the passage of propane, hydrogen, and propylene, and a plurality of electrically conductive, catalytically active particles separately supported on said structure, said particles being electrically insulated one from another and having surface portions exposed to direct contact with said propane in said channels, wherein the propane is heated to a temperature in the range 400° F. to 1200° F., and wherein the propane is then brought into contact with the surface portions of the particles to catalyze the dehydrogenation of the propane to form propylene, and wherein the propylene is then withdrawn from the reactor, an improvement comprising applying, while said propane is in contact with said surface portions, an electric potential difference between electrodes spaced apart one from another and opposed across said reaction zone, thereby causing said propane to react more rapidly to form propylene.

2. The process of claim 1 wherein the particles are composed essentially of chromia.

3. The process of claim 2 wherein the electric potential difference is periodically reversed.

4. The process of claim 3 wherein the potential difference is reversed at a rate between 0.5 kHz. and 3.0 kHz.

5. The process of claim 3 wherein the potential difference is maintained below the level producing ionization.

6. The process of claim 1 wherein the particles have exposed surface area in excess of 0.1 m.² per gram of support structure.

7. The process of claim 6 wherein the particles have points with radii of curvature less than 100 A.

References Cited
UNITED STATES PATENTS

| 2,257,177 | 9/1941 | Luster | 204—168 |
| 2,550,089 | 4/1951 | Schlesman | 204—168 X |
| 3,488,402 | 1/1970 | Michaels et al. | 260—683.3 X |
| 3,356,757 | 12/1967 | Roth et al. | 260—683.3 |

FOREIGN PATENTS

| 942,944 | 11/1963 | Great Britain | 260—683.3 |

F. C. EDMUNDSON, Primary Examiner

U.S. Cl. X.R.

204—683.3